United States Patent
Bistuer et al.

(10) Patent No.: US 8,807,894 B2
(45) Date of Patent: Aug. 19, 2014

(54) SURFACE-AREA SAFETY MEANS AND A VEHICLE

(71) Applicant: Eurocopter, Marignane (FR)

(72) Inventors: Olivier Bistuer, La Fare les Oliviers (FR); Laurence Maille, Marseilles (FR); Pierre Prudhomme-Lacroix, Vitrolles (FR)

(73) Assignee: Airbus Helicopters, Marignane Cedex (FR)

( * ) Notice: Subject to any disclaimer, the term of this patent is extended or adjusted under 35 U.S.C. 154(b) by 0 days.

(21) Appl. No.: 13/628,398

(22) Filed: Sep. 27, 2012

(65) Prior Publication Data

US 2013/0078049 A1   Mar. 28, 2013

(30) Foreign Application Priority Data

Sep. 28, 2011 (FR) ...................... 11 02937

(51) Int. Cl.
*B64D 9/00* (2006.01)
*B64C 1/22* (2006.01)
*E04H 4/06* (2006.01)

(52) U.S. Cl.
USPC .................. 410/97; 244/118.1; 244/118.2

(58) Field of Classification Search
USPC ........... 410/118, 97, 129, 96, 117; 244/118.1, 244/137.1; 24/265 CD
See application file for complete search history.

(56) References Cited

U.S. PATENT DOCUMENTS

| | | | |
|---|---|---|---|
| 2,669,402 A * | 2/1954 | Del Mar .................. | 410/118 |
| 5,540,402 A * | 7/1996 | Carducci .................. | 244/118.1 |
| 6,123,294 A * | 9/2000 | Genovese ................. | 244/110 C |
| 6,435,786 B1 | 8/2002 | Breckel | |
| 7,080,967 B2 * | 7/2006 | Ackerman et al. ............ | 410/118 |
| 7,140,823 B2 * | 11/2006 | Ackerman et al. ............ | 410/118 |
| 7,175,378 B2 * | 2/2007 | Brown et al. ................. | 410/118 |
| 2010/0186159 A1 * | 7/2010 | Dalickas .......................... | 4/504 |

FOREIGN PATENT DOCUMENTS

| | | |
|---|---|---|
| DE | 29517776 U1 | 3/1996 |
| DE | 19953615 A1 | 5/2001 |
| DE | 202005015336 U1 | 12/2005 |
| EP | 1338214 A1 | 8/2003 |
| EP | 1640210 A2 | 3/2006 |
| FR | 1118606 A | 6/1956 |
| GB | 2222357 A | 3/1990 |

OTHER PUBLICATIONS

Search Report and Written Opinion; Application No. FR 1102937; dated Jul. 6, 2012.

* cited by examiner

*Primary Examiner* — Glenn Dayoan
*Assistant Examiner* — Sunsurraye Westbrook
(74) *Attorney, Agent, or Firm* — Brooks Kushman P.C.

(57) ABSTRACT

Surface-area safety means (10) comprising a barrier net (20) and at least one fastener means (30), each fastener means (30) having a fastener strap (40) fastened to a segment (25) of said barrier net (20) and co-operating with a fastener member (50) suitable for fastening said fastener strap (40) to said structure (2). The fastener means (30) also include a tensioning strap (60) fastened thereto, said tensioning strap (60) including at least two tensioning eyelets (61), said fastener strap (40) having a securing system (200) for securing it to a tensioning eyelet (61) and securing the fastener strap (40) to the tensioning strap (60) by passing through a particular tensioning eyelet in order to tension said barrier net (20) to the tension corresponding to the particular tensioning eyelet.

20 Claims, 3 Drawing Sheets

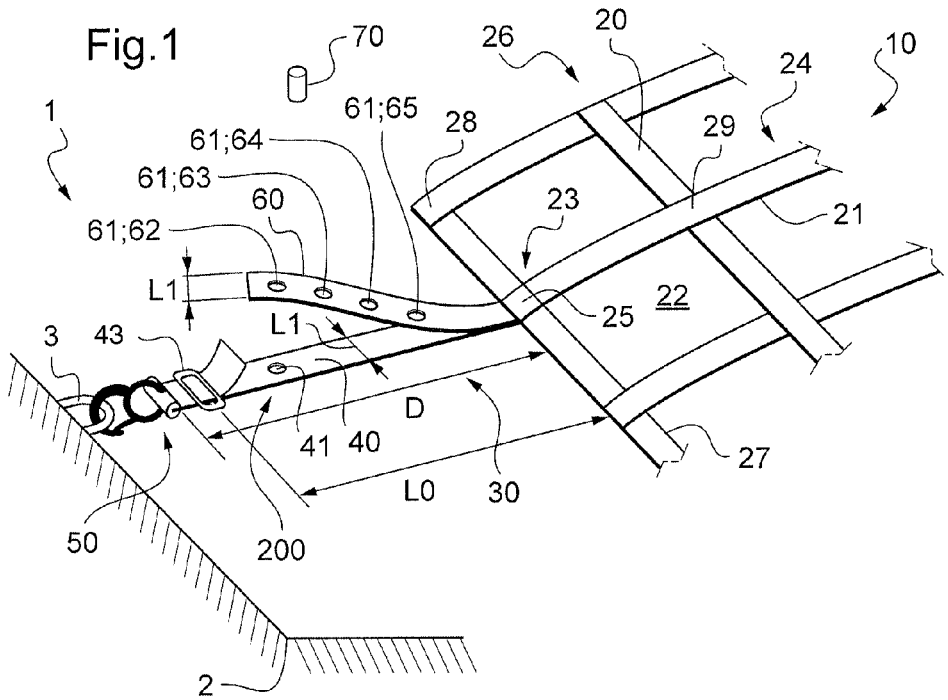

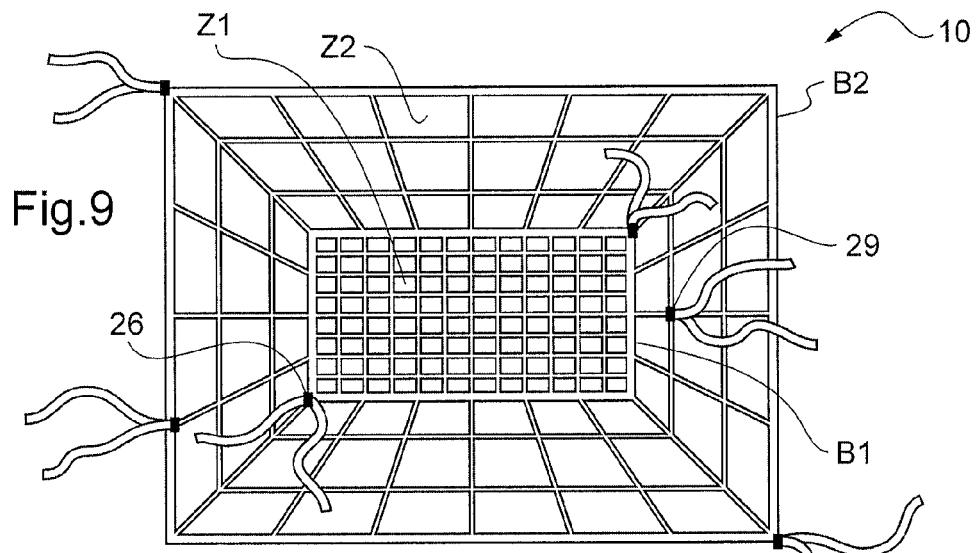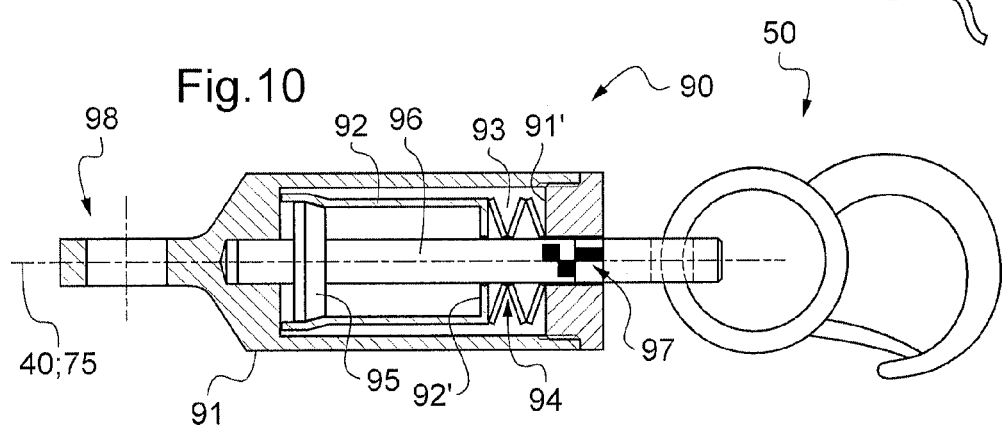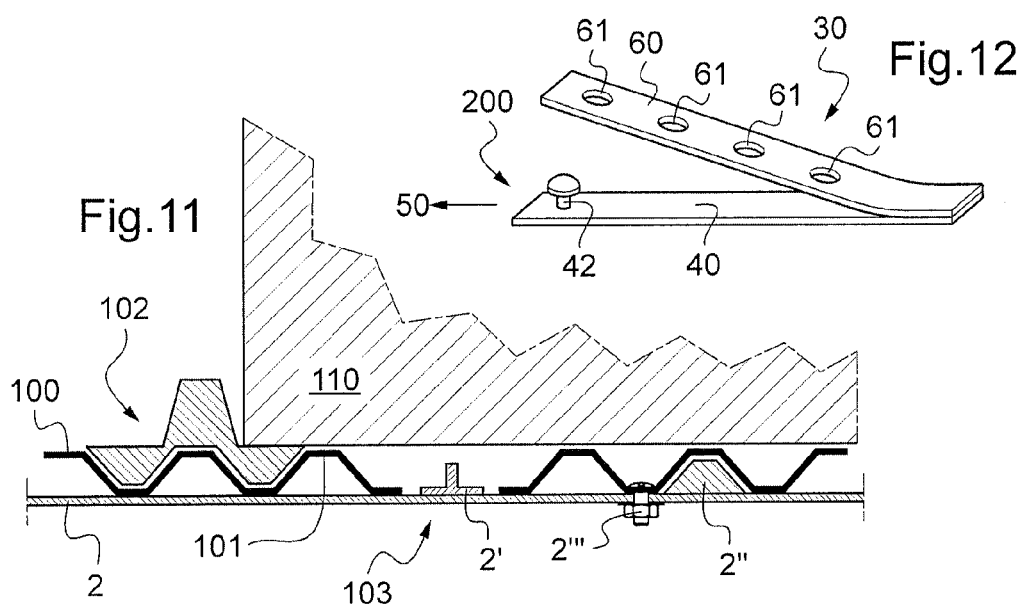

SURFACE-AREA SAFETY MEANS AND A VEHICLE

CROSS REFERENCE TO RELATED APPLICATION

This application claims priority to French Patent Application No. FR 11 02937 filed on Sep. 28, 2011, the disclosure of which is incorporated in its entirety by reference herein.

BACKGROUND OF THE INVENTION (1) Field of the Invention

The present invention relates to surface-area safety means, and to a vehicle provided with such surface-area safety means.

The invention relates to the general technical field of transporting freight in a vehicle, and more particularly in an aircraft. The term "vehicle" should be understood as meaning any type of transport means such as a truck, a car, a train, a boat, or an aircraft. The aircraft may have a fixed wing and/or a rotary wing, such as a rotorcraft, helicopter, hybrid helicopter, or any other type of aircraft.

The present description refers more particularly to aircraft, however the invention is not limited in any way to such a particular application.

(2) Description of Related Art

Managing payloads on board aircraft is of great importance, both in economic terms and in terms of the level of safety of aircraft in flight. Efforts are constantly being made to maximize payloads while improving safety in flight, or in general during a mission carried out by a vehicle transporting freight.

In order to ensure safety in flight for an aircraft, it is necessary to prevent payloads from moving so as to avoid any undesirable movement of payloads during a flight. Furthermore, keeping payloads stationary in a predefined arrangement generally makes it possible to ensure both a degree of balance in the distribution of payloads and an acceptable location for the center of gravity of the loaded aircraft.

In the remote technical field of containers, devices are known that comprise inflatable cushions, straps, and/or tarpaulins for preventing payloads from moving in a container.

In the field of cars, devices are known for pressing pieces of baggage against vertical walls of a trunk or against a floor of the trunk.

In general, devices are known that make use of inflatable bubbles or evacuated bags for holding payloads against a given surface.

Devices are also known seeking to magnetize payloads against a metal floor.

In the field of aviation, and in particular in aircraft of large size, it is possible to arrange payloads on pallets that are fastened to rails.

It is also possible to envisage preventing payloads from moving with the help of a safety surface of the barrier net type.

Each barrier net is then releasably fastened by at least one fastener means to attachment points of the vehicle.

The barrier net may be arranged in a substantially vertical plane so as to compartmentalize an inside space of the vehicle, or in a substantially horizontal plane so as to press the payloads against a floor.

In another option, the barrier net is a circular stretchy net.

In the context of an aircraft, the person skilled in the art often uses the solution comprising a barrier net that presses payloads against a floor or against a vertical partition, the aircraft then moving through three-dimensional space.

More precisely, the person skilled in the art selects a barrier net from a list of barrier nets depending on the volume of the payloads and on the dimensions of the payloads.

Furthermore, in order to guarantee that payloads are held in a given position in flight, the flight manual may require the barrier net to be tensioned to a predetermined tension. Nevertheless, it can be difficult to verify that the applied tension corresponds to the required tension.

The state of the art includes document DE 19 953 615. That document DE 19 953 615 describes attachment means comprising a strap, a first end portion of the strap being fastened to a ring co-operating with a system for attachment to a rail, a second end portion of the strap co-operating with spring clip means. The clip means also include means for adjusting the segment of the strap going from said ring towards the resilient clip means.

Document U.S. Pat. No. 6,435,786 describes a barrier net for compartmentalizing a space.

The barrier net is provided with an irregular mesh made using radial straps and circumferential straps.

The radial straps include fastener means. Each fastener means includes specifically a belt having a folded portion extended by an end portion provided with a member for fastening to a structure.

In addition, a break-out segment is stitched firstly to the folded portion and secondly to the end portion. The function of the break-out segment is to allow the folded portion to be deployed under predetermined conditions.

Document EP 1 640 210 describes a barrier net that is tensioned using a fastener tube that cooperates with a belt.

The following documents are also known: DE 20 2005 015336, GB 2 222 357, FR 1 118 606, DE 295 17 776, and EP 1 338 214.

BRIEF SUMMARY OF THE INVENTION

An object of the present invention is thus to propose surface-area safety means comprising a barrier net that makes it possible to overcome the above-mentioned limitations, so as to prevent payloads from moving under the conditions specified by the manufacturer in compliance with the regulations that are in force.

According to the invention, surface-area safety means for retaining payloads in a vehicle comprise a barrier net and at least one fastener means for fastening the barrier net to a structure of the vehicle. Each fastener means includes a fastener strap fastened to a segment of the net, the fastener net co-operating with a fastener member suitable for fastening the fastener strap to the structure.

The surface-area safety means is remarkable in particular in that the fastener means each include a tensioning strap fastened to said segment in parallel with a fastener strap of the fastener means, the tensioning strap including at least two tensioning eyelets, each corresponding to a predetermined tension of the barrier net, the fastener strap having a securing system in order to secure it to a tensioning eyelet and securing the fastener strap to the tensioning strap by passing through a particular tensioning eyelet in order to tension the barrier net to the tension corresponding to the particular tensioning eyelet.

It should be observed that the tensioning strap may be fastened directly to a segment of the net, or it may be fastened indirectly by being secured to a fastener strap that is itself fastened directly to the segment.

Thus, each tensioning eyelet is calibrated. Each tensioning eyelet is then associated with a tension of the barrier net. For example, a first tensioning eyelet is associated with the barrier net being subjected to a tension of 50 decanewtons (daN) while a second tensioning eyelet of the tensioning strap is associated with the barrier net being subjected to a tension of 100 daN.

An operator seeking to prevent payloads from moving in a vehicle fastens the fastener members to fastener points of the structure.

Under such circumstances, the operator exerts a tension on each tensioning strap in order to connect the appropriate tensioning eyelet to the fastener strap by means of the securing system. It can be understood that an operator may make use of a winder that is temporarily fastened to the structure of the vehicle in order to perform this step of the applied method.

In addition, it can be understood that it is advantageous for each tensioning strap to lie over the associated fastener strap.

The operator then prevents each tensioning strap from moving by securing it to the associated fastener strap using the securing system, which securing system comprises at least means passing through the required tensioning eyelet.

In the above example, in order to obtain tensioning of the barrier net having a value of 100 daN, the operator secures the second tensioning eyelet of each tensioning strap to the corresponding fastener strap by means of the securing system.

Under such circumstances, the invention makes it possible to put the barrier net under a tension as predetermined by the manufacturer for stowing payloads correctly. An operator may optionally make use of a winder for fastening the tensioning strap to the fastener strap, but there is no need for a dynamometer for use in verifying that the barrier net is sufficiently tensioned.

The surface-area safety means may also include one or more of the following additional characteristics.

Thus, the fastener strap and the tensioning strap of fastener means may extend longitudinally over respective lengths that are the same and transversely over respective widths that are the same.

In another aspect, the fastener strap of fastener means may be stiff while the tensioning strap of the fastener means is stretchy.

This relative characteristic means that the fastener strap presents stiffness that gives rise to a small amount of stretching when a force is applied thereto. In contrast, the tensioning strap presents sufficient elasticity in order to enable it to be stretched so that each of the tensioning eyelets can co-operate with the securing system, and the particular tensioning eyelet that is selected for co-operating with the securing system then depending on the magnitude of the force applied thereto.

Thus, when an operator exerts a force on the tensioning strap, the tensioning strap is stretched so as to be lengthened, while on the contrary the fastener strap stretches little or not at all.

Furthermore, a fastener strap extends longitudinally from the segment to which it is fastened towards a fastener member, and the surface-area safety means include means for adjusting the distance between the segment and said fastener member.

The adjustment means may be conventional means. Furthermore, the adjustment means may be incorporated in the fastener member. A fastener member of the type described in FIG. 1 of document DE 19 953 615 may be envisaged.

Furthermore, the surface-area safety means may include superposition means for superposing the fastener strap and the tensioning strap of fastener means.

Such superposition means may comprise bands holding together a fastener strap and a tensioning strap so as to make it easier for these fastener and tensioning straps to be secured to each other.

In a first embodiment, the securing system comprises a removable securing peg and a single fastener eyelet formed in the fastener strap, the removable securing peg securing the fastener strap to the tensioning strap by passing through the fastener eyelet and a particular tensioning eyelet in order to tension said barrier net to the tension corresponding to the particular tensioning eyelet.

Under such circumstances, the operator exerts tension on each tensioning strap in order to bring the appropriate tensioning eyelet into coincidence with the fastener eyelet. It can be understood that an operator may make use of a winder that is fastened temporarily to the structure in order to perform this step of the applied method.

In addition, it can be understood that it is advantageous for each tensioning strap to lie over the associated fastener strap.

Consequently, the operator prevents each tensioning strap from moving by securing it to the associated fastener strap by means of a securing peg, each securing peg being inserted in the facing fastener and tensioning eyelets.

The term "securing peg" is used to mean a peg as such, or any equivalent means suitable for passing through a fastener eyelet and a tensioning eyelet.

In the above example, in order to obtain tensioning of the barrier net at a value of 100 daN, the operator secures the second tensioning eyelet of each tensioning strap to the associated fastener eyelet.

In a first variant of the first embodiment, the securing peg includes a ball bushing.

For example, the securing peg is provided with an elongate member secured to grip means. A first end zone of the elongate member may include a shoulder, while a second end zone of the elongate member includes a plurality of retractable balls.

When the securing peg is pushed into the eyelet, the balls penetrate into the elongate member, with the balls projecting from the elongate member when the second end zone has passed through the eyelets. The fastener strap and the tensioning strap are then held together in elevation between said shoulder and said balls.

In a second variant of the first embodiment, the securing peg may include two securing means connected together by a resilient member, the resilient member urging the securing means apart in order to block the securing peg in the fastener eyelet and in a tensioning eyelet.

Under such circumstances, an operator exerts a force on the securing peg in order to move the securing means towards each other. In this retracted configuration, it is possible to insert the securing peg in the eyelets.

When the operator releases the securing peg, the resilient member tends to return to its original shape, moving the securing means apart from each other, thereby wedging the securing peg in the eyelets.

In a second embodiment, the securing system comprises a fastener hook of the fastener strap designed to engage in the tensioning eyelets of the tensioning strap.

The operator then exerts a traction force on the tensioning strap in order to bring the selected tensioning eyelet into register with the fastener hook of the fastener strap.

Position may be maintained either by the hook having a shape of sufficient depth, or else by locking the hook (turning its head or any other means), or by a resilient loop element surrounding the tensioning strap and the fastener strap so as to prevent any risk of untimely unhooking.

Furthermore, the barrier net includes at least two adjacent edges connected together via a vertex, and the safety means may include fastener means fastened to each vertex.

Alternatively, or in addition, said barrier net includes a mesh made by using strands, with each strand extending from a first end to a second end, and each end of at least one strand represents a segment secured to fastener means.

Furthermore, said barrier net includes a mesh made by using strands, with each strand extending from a first end to a second end, two strands crossing at an intersection located between their first and second ends, at least one intersection representing a segment secured to fastener means.

It should be observed that the barrier net may have a "modular" configuration in order to contain payloads of various shapes and volumes.

For example, the barrier net may include an inner zone presenting small meshes and an outer zone presenting large meshes.

The inner edge defining the inner zone by lying between the inner zone and the outer zone, and the outer edge defining the outer zone may then each include segments that are secured to fastener means of the invention, the fastener strap and the tensioning strap of each fastener means possibly being stitched to the associated segment, for example.

Thus, in order to prevent movement of payloads occupying a small volume, an operator may decide to use the inner zone only of the net by using fastener means that are fastened to the inner edge. The outer zone then hangs around the payloads, or it may be folded so as to stop it flapping while the vehicle is moving.

In contrast, in order to prevent movement of payloads occupying a large volume, an operator may use the entire barrier net, with the barrier net being fastened to a structure using fastener means fastened to the outer edge.

It can be understood that fastener means may be secured to segments of the barrier net that are arranged within the inner zone or within the outer zone, should that be necessary.

Under such circumstances, the barrier net is a net that is adapted to multiple utilizations.

Furthermore, at least one of the fastener means may include energy absorber means, preferably in series between the barrier net and the fastener member of the fastener means, or indeed incorporated in the fastener member.

The function of the energy absorber means is to limit the peak loads transmitted to the structure during regulation emergency landing conditions, i.e. a crash that occurs under the conditions specified by the regulations in force, in order to ensure that the forces generated by the loads do not exceed either the strength of the structure to which the barrier net is fastened or the strength of the fastener and tensioning straps.

By way of example, the energy absorber means comprise a piston arranged in a hollow tube, the hollow tube being placed in an outer body, resilient means being placed between the hollow tube and the body. In addition, the piston is secured to a rod projecting from the body. Under such circumstances, the resilient means serve to allow both the hollow tube and the piston to move longitudinally together inside the body when a force below a threshold is exerted on the fastener means, the piston being moved longitudinally relative to the hollow tube by deforming the hollow tube when the force is greater than said threshold.

Under regulation emergency landing conditions, the deformation of the hollow tube by work hardening then makes it possible to limit the peak loads transmitted to the structure.

It should be observed that the energy absorber means are inexpensive and easily replaceable, in particular in the event of them being triggered accidentally while tightening the tensioning strap, for example.

Furthermore, it is possible, for example, to arrange a visual tensioning indicator on the rod so as to avoid exceeding the said threshold while tensioning the tensioning strap.

In another aspect, the surface-area safety means include a stamped metal sheet provided with repetitive patterns on which payloads can be placed.

The stamped metal sheet with repetitive patterns in relief is arranged on the floor of the vehicle in order to perform the following functions:
provide a structure surface for the payloads other than the floor itself;
enable the payloads to be "chocked" in modular manner by using blocking chocks that are engaged in the patterns; and
protect the structure and provide a surface that may possibly be flattened in the event of an excessive load.

The stamped sheet metal may include cutouts, the cutouts serving to avoid interference between the sheet metal and inserts of the structure such as metal fittings. It can be understood that the thickness of the stamped shapes may then be greater than the thickness of said inserts.

Furthermore, the sheet metal may include patterns that are suitable for co-operating with means for positioning the structure.

The stamped sheet metal may comprise one or more portions, being made out of a material that is robust and light in weight.

In addition to a surface-area safety means, the invention also provides a vehicle, and more particularly an aircraft.

According to the invention, a vehicle is provided with an inside space defined by a structure such as a floor, the structure having a plurality of anchor points.

The vehicle is remarkable in particular in that it includes surface-area safety means of the type described above, the surface-area safety means including a barrier net and a plurality of fastener means, each fastener means co-operating with an anchor point.

BRIEF DESCRIPTION OF THE SEVERAL VIEWS OF THE DRAWINGS

The invention and its advantages appear in greater detail from the following description of embodiments given by way of illustration and with reference to the accompanying figures, in which:

FIG. 1 is an approximate diagram of a vehicle in a first embodiment of the invention;

FIG. 2 is a diagram showing superposition means;

FIG. 3 is a diagram for clarifying a securing peg in a first variant of the first embodiment;

FIGS. 4 and 5 are diagrams for clarifying a securing peg in a second variant of the first embodiment;

FIGS. 6 to 9 are diagrams showing variants of surface-area safety means;

FIG. 10 is a section of energy absorber means;

FIG. 11 is a section through a metal sheet stamped in accordance with the invention; and FIG. 12 is a diagram presenting a second embodiment of the fastener means.

Figure 6:
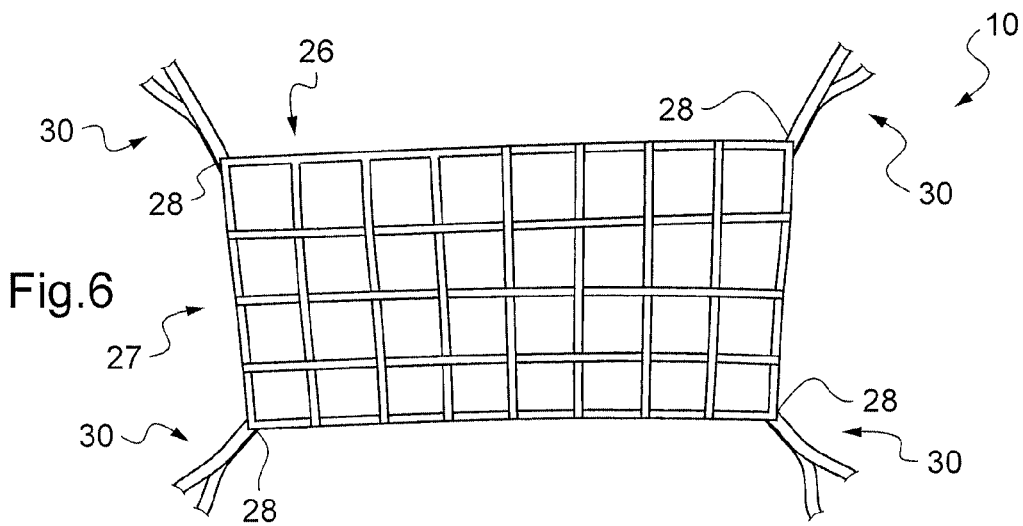

Elements present in more than one of the figures are given the same references in each of them.

DETAILED DESCRIPTION OF THE INVENTION

FIG. 1 shows a vehicle 1 provided with a structure 2 having surface-area safety means 10 fastened thereto.

The vehicle 1, e.g. an aircraft, and the structure 2 are shown in approximate manner in order to avoid pointlessly overloading FIG. 1.

In order to hold payloads within the vehicle, the aircraft includes surface-area safety means 10 co-operating with anchor points 3 of the structure 2.

The surface-area safety means 10 include a barrier net 20. The barrier net is provided with a mesh having a plurality of strands 21 extending from a first end 23 to a second end 24. Two distinct strands 21 may cross at an intersection 29, e.g. located between the first end 23 and the second end 24 of at least one strand 21.

It should be observed that two strands may constitute two adjacent edges 26 and 27 of the barrier net, which strands meet at their first ends, referred to as a "vertex" 28.

In order to fastener the barrier net to the structure 2, the surface-area safety means 10 include a plurality of fastener means 30 secured to the barrier net 20.

Each fastener means 30 comprises a fastener strap 40 fastened firstly to a segment 25 of the barrier net and secondly to a fastener member 50. By way of example, and with reference to FIG. 1, the fastener member 50 may comprise a hook suitable for co-operating with a ring of an anchor point 3.

The fastener strap 40 then extends longitudinally from a segment 25 over a length L0, extends transversely over a width L1, and extends in elevation over a thickness.

Furthermore, the fastener strap 40 of fastener means may co-operate with strap length adjustment means 43, the strap length adjustment means 43 serving to adjust the distance D between the segment 25 and the fastener member 50 secured to the fastener strap 40.

The strap length adjustment device 43 may be incorporated in the fastener member 50.

In addition to the fastener strap 40, the fastener means 30 include a tensioning strap 60 secured to a segment 25 in parallel with the fastener strap 40.

By way of example, the fastener strap 40 and the tensioning strap 60 may be secured to the same segment 25 by stitching or by any other known means complying with the regulations in force.

The tensioning strap 60 of a fastener means 30 may extend longitudinally and transversely respectively over the same length L0 and over the same width L1 as the fastener strap 40 of the fastener means 30.

In another aspect, the tensioning strap 60 is provided with at least two eyelets 61 passing through its thickness, these at least two eyelets being referred to as "tensioning eyelets".

Each tensioning eyelet is associated with a predetermined tension for the barrier net. Thus, by way of example, each tensioning strap 60 may have four tensioning eyelets 62, 63, 64, and 65 respectively associated with subjecting the net to tensioning at 50 daN, 80 daN, 110 daN, and 150 daN.

Under such circumstances, an operator uses the fastener means 30 to tension the barrier net 20 at a target tension, this target tension being defined, e.g. in a manual for the vehicle, as a function of payload characteristics such as shape and weight characteristics.

Consequently, the fastener strap 40 includes a securing system 200 suitable for securing the fastener strap 40 to the tensioning strap 60 by passing through the appropriate tensioning eyelet.

In the first embodiment shown in FIG. 1, the securing system 200 includes a single eyelet 41 passing through the thickness of the fastener strap 40, this single eyelet being referred to as the "fastener" eyelet.

The securing system 200 also includes a securing peg 70 suitable for passing both through the fastener eyelet 41 and one of the tensioning eyelets 61.

If tensioning by 110 daN is required, the operator places the third tensioning eyelet 64 of each tensioning strap 61 in register with the fastener eyelet 41 of the corresponding fastener strap, and then secures the third tensioning eyelet 64 to the fastener eyelet 41 by using a securing peg 70 passing through both of them.

In order to enable a plurality of tensioning eyelets to co-operate with a given fastener eyelet 41 without excessively stretching the fastener strap, the fastener strap 40 of the fastener means 30 is stiff, whereas on the contrary the tensioning strap 60 is stretchy.

With reference to FIG. 2 and independently of the embodiment, it should be observed that fastener means 30 may include superposition means 80, the superposition means 80 possibly being provided with a plurality of holding bands 81, 82.

With reference to FIG. 3, in a first variant of the first embodiment, a securing peg 70 includes a ball bushing 75.

A ball bushing 75 is provided with an elongate element 72 having a first end zone with a shoulder 73 and a second end zone including balls 74 that are retractable at least in part into the elongate element 72.

Furthermore, the bushing 75 advantageously includes grip means 71.

FIGS. 4 and 5 are respectively a section view and a plan view of a second variant of the first embodiment.

In this second variant, the securing peg 70 has two securing means 76 and 77 connected together by a resilient member 78 such as a spring.

The resilient member 78 urges said securing means 76 and 77 apart along arrows F in order to block the securing peg 70 in a fastener eyelet 41 of the fastener means shown and in a tensioning eyelet 61 of the fastener means.

FIG. 12 shows a second embodiment.

In this second embodiment, the securing system 200 includes a securing hook 42. The securing hook is then secured to the fastener strap and may be inserted in any of the tensioning eyelets 61.

FIGS. 6 to 9 show preferred variants of the surface-area safety means 10.

In the first variant of FIG. 6, the barrier net 20 of the surface-area safety means 10 is of polygonal shape.

Each vertex 28 of the barrier net is then provided with fastener means 30 of the invention.

Figure 7:
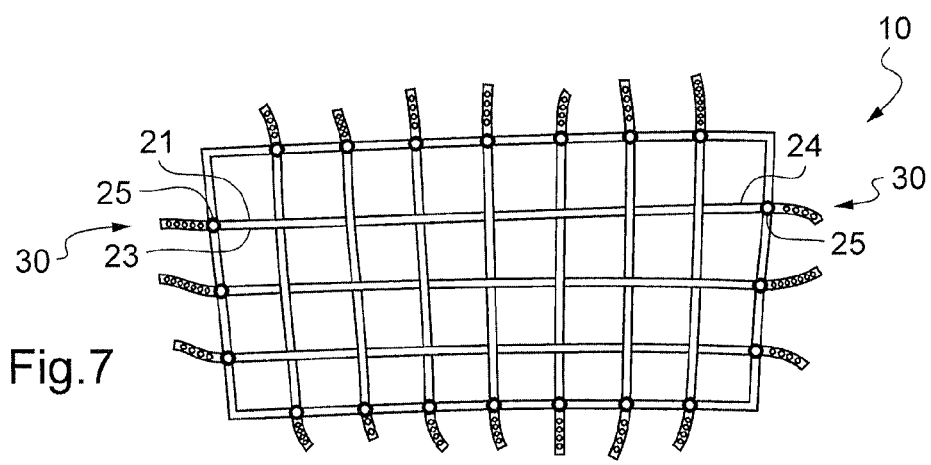

In the second variant of FIG. 7, fastener means 30 are arranged at the end of each strand 21 of the barrier net 20 of the surface-area safety means 10, with the exception of the vertices 28 of the polygon defining the barrier net 20.

It can nevertheless be understood that it is possible to fasten fastener means to these vertices 28, as suggested by the first variant.

Figure 8:
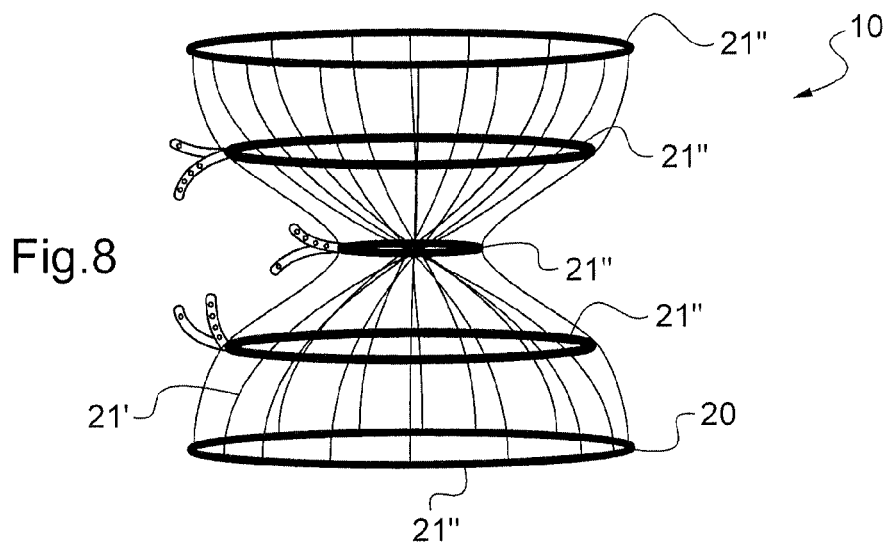

In the third variant of FIG. 8, surface-area safety means 10 comprise a barrier net 20 of the circular net type.

The barrier net has longitudinal strands 21' and transverse strands 21". The transverse strands 21" are closed loops, with the first end of each of these strands being secured to its second end.

In the fourth variant of FIG. 9, the surface-area safety means 10 are provided with a barrier net 20 having meshes of a size that increases going away from the center of the barrier net.

For example, the barrier net 20 comprises an inner zone Z1 defined by an inner edge B1 that is provided with meshes of small size, and an outer zone Z2 defined between the inner edge B1 and an outer edge B2. The outer zone Z2 is then provided with meshes of large size.

Under such circumstances, it is possible to arrange fastener means 30 at intersections 26, and in particular at intersections to be found on the inner edge B1.

Furthermore, at least one fastener means may include energy absorber means 90, e.g. interposed between the fastener member 50 and the fastener strap 40, or indeed incorporated in the fastener member 50.

It should be observed that it is possible to fit the barrier net with single fastener means 30, the barrier net having at least one edge secured to the structure of the vehicle, for example.

In an embodiment, the fastener means include energy absorber means 90 comprising a body 91 defining a chamber 93. A hollow tube 92 is then arranged in the chamber 93, with a resilient member 94 of the Belleville washer type being arranged longitudinally between an end wall 92' of the hollow tube 92 and a seat 91' of the body 91.

Furthermore, the energy absorber means 90 possess a piston 95 in contact with the inside of the hollow tube 92. The piston is also secured to a rod 96 projecting in part from the body 91.

Under such circumstances, the rod 95 may optionally be fastened to the fastener member 50. Thus, an attachment zone 98 of the body 91 remote from the rod 96 is fastened to the fastener strap 40 or to the strap length adjustment means 43 of the fastener strap 40, where appropriate.

It should be observed that the rod 96 may include display means 97 enabling an operator to know whether the energy absorber means 90 are being stressed while tensioning the barrier net.

With reference to FIG. 11, the surface-area safety means may include stamped sheet metal 100 with repetitive patterns 101 for receiving payloads 110.

The patterns 101 may co-operate with blocking chocks 102 suitable for blocking the payloads 110.

Similarly, the patterns 101 may co-operate with blocking inserts 2" of the structure 2, or indeed with screws 2"', or with equivalent means.

It should be observed that the stamped sheet metal may include cutouts 103 so as to avoid interfering with the inserts 2' of the structure 2, such as inserts for fastening seats, for example.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A surface-area safety means comprising:
    a barrier net;
    a fastener means for fastening the barrier net to a structure, each fastener means including:
        a fastener strap fastened the barrier net and co-operating with a fastener member for connecting the fastener strap to the structure; and
        a tensioning strap fastened the barrier net and extending in parallel to the fastener strap of the fastener means, the tensioning strap including at least two tensioning eyelets, each corresponding to a predetermined tension of the net,
    wherein fastener strap has a securing system for securing the fastener strap to one of the at least two tensioning eyelets thereby securing the fastener strap to the tensioning strap by passing through a particular tensioning eyelet in order to tension the barrier net to the predetermined tension corresponding to the particular tensioning eyelet.

2. The surface-area safety means according to claim 1, wherein the fastener strap is stiff, said tensioning strap being stretchy.

3. The surface-area safety means according to claim 1, wherein the fastener strap extends longitudinally from the barrier net towards the fastener member, wherein the surface-area safety means includes a strap length adjustment device for adjusting the distance between the barrier net and the fastener member.

4. The surface-area safety means according to claim 1, further comprising a plurality of bands for superposing the fastener strap and the tensioning strap so that the fastener strap remains parallel to the tensioning strap.

5. The surface-area safety means according to claim 1, wherein the securing system includes a removable securing peg and a single fastener eyelet formed in the fastener strap, the removable securing peg securing the fastener strap to the tensioning strap by passing through the fastener eyelet and one of the tensioning eyelets in order to tension the barrier net to the predetermined tension corresponding to the particular tensioning eyelet.

6. The surface-area safety means according to claim 5, wherein the securing peg includes a ball bushing.

7. The surface-area safety means according to claim 5, wherein the securing peg includes two securing means connected together by a resilient member, the resilient member urging the securing means apart in order to block the securing peg in the fastener eyelet and in one of the tensioning eyelets.

8. The surface-area safety means according to claim 1, wherein the barrier net includes at least two adjacent edges connected together via a vertex, and wherein surface-area safety means include fastener means fastened to each vertex.

9. The surface-area safety means according to claim 1, wherein the barrier net includes a mesh made by using strands, with each strand extending from a first end to a second end, and each end of at least one strand represents a segment secured to the fastener means.

10. The surface-area safety means according to claim 1, wherein the barrier net includes a mesh made by using strands, with each strand extending from a first end to a second end, two strands crossing at an intersection located between their first and second ends, at least one intersection representing a segment secured to the fastener means.

11. The surface-area safety means according to claim 1, wherein at least one of the fastener means includes energy an absorber means that includes a piston arranged in a hollow tube, the hollow tube being placed in an outer body, resilient means being placed between the hollow tube and the body, the piston being secured to a rod projecting from the body, the resilient means allowing both the hollow tube and the piston to move longitudinally together inside the body when a force below a threshold is exerted on the fastener means, the piston being moved longitudinally relative to the hollow tube by deforming the hollow tube when the force is greater than the threshold.

12. The surface-area safety means according to claim 1, further comprising a stamped metal sheet provided with repetitive patterns on which payloads can be placed.

13. A vehicle having an inside space defined by a structure having a plurality of anchor points, wherein the vehicle includes the surface-area safety means according to claim 1, the surface-area safety means including a plurality of fastener means, each fastener means co-operating with one of the plurality of anchor points.

14. A securement system for a vehicle, the securement system comprising:
- a barrier net;
- a fastener strap extending between and connecting the net to an anchor point on the vehicle;
- a tensioning strap connected to the net and extending parallel with the fastener strap, the tensioning strap including first and second tensioning eyelets corresponding to first and second predetermined tensions of the net; and
- a peg connecting the fastener strap to the tensioning strap, wherein the peg cooperates with the first eyelet to set the first tension of the net when the tensioning strap is in a first position, and the peg cooperates with the second eyelet to set a second tension of the net when the tensioning strap is moved to a second position.

15. The securement system according to claim 14, wherein the peg includes a resilient member that is expandable and prevents the peg from being removed from the one of the first and second eyelets.

16. The securement system according to claim 15, wherein the peg includes a ball bushing connected with to the resilient member such that a pair of balls engage the tensioning strap and prevent the peg from being removed from the one of the first and second eyelets.

17. The securement system according to claim 15, wherein the peg includes two securing means connected together by the resilient member, wherein the resilient member urges the securing means apart in order to engage the tensioning strap and prevent the peg from being removed from the one of the first and second eyelets.

18. The securement system according to claim 14 wherein the vehicle includes a plurality of anchor points, and wherein the securement system includes a plurality of fastener straps, each fastener strap extending between and connecting the net to one of the plurality of anchor points, and further comprising a plurality of tensioning straps cooperating with the plurality of fastener straps.

19. The securement system according to claim 18, wherein the barrier net includes a mesh made of a plurality of strands with each strand extending from a first end to a second end, and each of the first and second end of each stand defining a securement segment, wherein, one of the plurality of fastener straps and one of the plurality of tensioning straps are secured to the barrier net at each securement segment.

20. The securement system according to claim 18, wherein the barrier net includes a mesh made of a plurality of strands, two strands crossing at an intersection, at least one intersection defining a securement segment wherein, one of the plurality of fastener straps and one of the plurality of tensioning straps are secured to the barrier net at each securement segment.

* * * * *